United States Patent [19]

Ito et al.

[11] Patent Number: 4,634,837
[45] Date of Patent: Jan. 6, 1987

[54] SINTERED CERAMIC HEATER ELEMENT

[75] Inventors: Novuei Ito, Nukata; Kinya Atsumi, Toyohashi; Hitoshi Yoshida; Morihiro Atsumi, both of Okazaki, all of Japan

[73] Assignees: Nippon Soken, Inc., Nishio; Nippondenso Co., Ltd., Kariya, both of Japan

[21] Appl. No.: 717,875

[22] Filed: Mar. 29, 1985

[30] Foreign Application Priority Data

Apr. 9, 1984 [JP] Japan .................................. 59-70670

[51] Int. Cl.$^4$ ......................... H05B 3/12; F02P 19/02
[52] U.S. Cl. .................... 219/270; 123/145 A; 219/553; 361/266
[58] Field of Search ....................... 219/553, 260–270; 123/145 R, 145 A; 361/264–266

[56] References Cited

U.S. PATENT DOCUMENTS

| 3,248,346 | 4/1966 | Amberg et al. | 252/518 |
|---|---|---|---|
| 3,875,476 | 4/1975 | Crandall et al. | 338/330 X |
| 3,875,477 | 4/1975 | Fredriksson et al. | 261/264 |
| 3,895,219 | 7/1975 | Richerson et al. | 219/553 |
| 4,357,526 | 11/1982 | Yamamoto et al. | 219/544 |
| 4,401,065 | 8/1983 | Minegishi et al. | 123/145 A |
| 4,437,440 | 3/1984 | Suzuki et al. | 123/145 A |
| 4,449,039 | 5/1984 | Fukazawa et al. | 219/553 |
| 4,475,029 | 10/1984 | Yoshida et al. | 219/270 |
| 4,486,651 | 12/1984 | Atsumi et al. | 219/553 |
| 4,499,366 | 2/1985 | Yoshida et al. | 219/270 |
| 4,556,780 | 12/1985 | Atsumi et al. | 219/270 |

Primary Examiner—A. Bartis
Attorney, Agent, or Firm—Cushman, Darby & Cushman

[57] ABSTRACT

A sintered ceramic electric heater suitably applicable to a glow plug of a diesel engine has a heater element formed of an electrically conductive sintered ceramic integrally sintered with a support member made of an electrically insulating sintered ceramic material. The heater element is formed as a sintered body of a mixture of $MoSi_2$ powder having an average diameter not greater than 2 μm and 35 to 75 mol % of $Si_3N_4$ powder. The average particle diameter of the $Si_3N_4$ powder is at least twice as large as that of the $MoSi_2$ powder so that electrically interconnecting $MoSi_2$ particles surround scattered $Si_3N_4$ particles whereby the resistance of the heater element becomes equal to that of $MoSi_2$ and the temperature coefficient of the heater element is increased.

4 Claims, 8 Drawing Figures

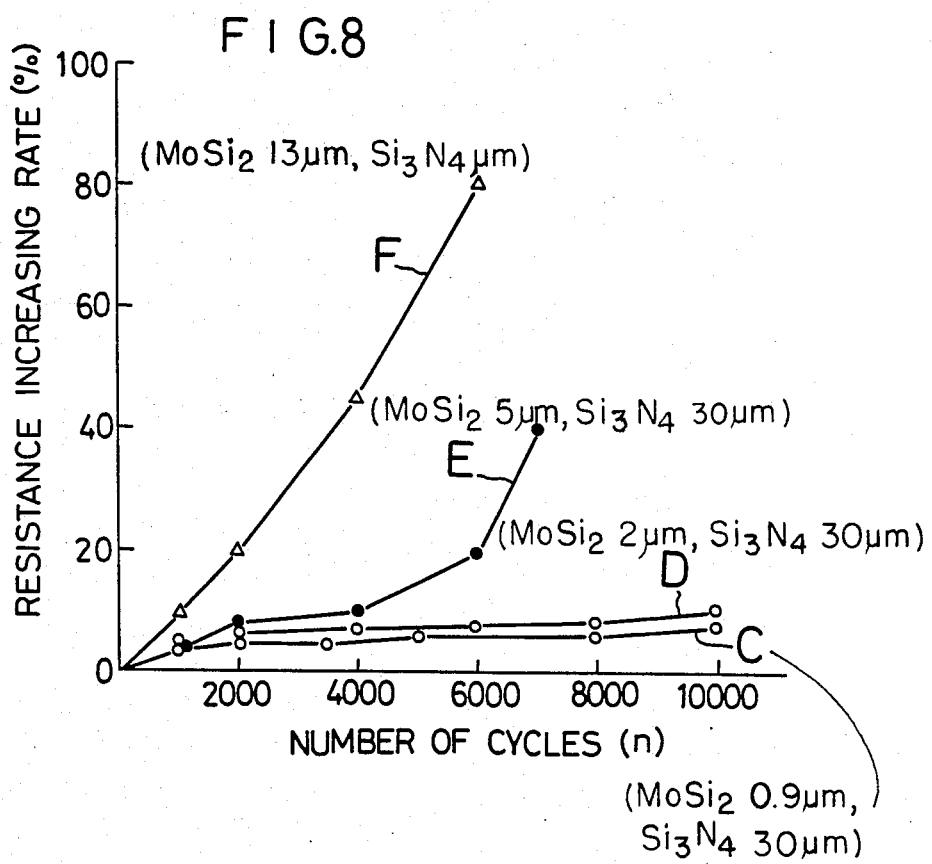

SINTERED CERAMIC HEATER ELEMENT

BACKGROUND OF THE INVENTION

1. Field of the Invention

The present invention relates to a ceramic herater which is durable in high temperature atmosphere, especially a ceramic heater effectively applied to a glow plug or the like.

2. Description of the Prior Art

The glow plug has been used for improving the startability of the diesel engine at a low temperature. So, the glow plug is required to exhibit a rapidly heating property.

The present inventors have developed a ceramic heater for use in a glow plug, comprising a heater element formed of a sintered body of a mixed powder of molybdenum disilicide ($MoSi_2$) as an electrically conductive ceramic having excellent oxidization resistance, and silicon nitride ($Si_3N_4$) as a ceramic having low coefficient of thermal expansion, and a heater support member formed of electrically insulating ceramic sintered body for supporting the heater element (U.S. Pat. No. 4,486,651). The glow plug provided with this ceramic heater is superior in the rapidly heating property since the heater element thereof directly heats the interior of the combustion chamber.

$MoSi_2$, which is a constituent of the heater element gives oxidization resistance to the heater element while $Si_3N_4$ gives thermal shock resistance to the heater element. Therefore, the obtained glow plug is superior in the durability.

In the glow plug, the temperature of the heater element is controlled in accordance with the driving condition of the diesel engine and the temperature within the combustion chamber thereof.

One of the temperature controlling methods is the resistance detecting method. In this method, the temperature change of the heater element is detected from the resistance change thereof, based on such a property of the heater element that the resistance thereof changes with the temperature change thereof. So, the heater element used in this method is required to have a large temperature coefficient of resistance.

SUMMARY OF THE INVENTION

It is an object of the present invention to provide a ceramic heater which is superior in the rapidly heating property and can accurately control the temperature thereof by the resistance detecting method.

It is another object of the present invention to provide a ceramic heater which exhibits such excellent durability as to be exposed to the high temperature atmosphere, and has a large temperature coefficient of resistance.

The ceramic heater of the present invention comprises a ceramic heater element which generates heat upon receiving electric current, a heater support member made of an electrically insulating ceramic for supporting the heater element and an electric current supply means for supplying electric current to the heater element.

The heater element of the present invention is formed by sintering a mixture composed of $MoSi_2$ powder having an average particle diameter of not greater than 2 μm and 35 to 75 mol% of $Si_3N_4$ powder having an average particle diameter of at least twice as large as that of $MoSi_2$ powder.

The heater element of the present invention has such a structure that $MoSi_2$ particles having a smaller particle diameter are interconnected and surround $Si_3N_4$ particles having a larger particle diameter. Therefore, the resistance of the heater element becomes equal to that of $MoSi_2$ itself.

In contrast, in case that the particle diameter of the $MoSi_2$ particle is the same as that of the $Si_3N_4$ particle, the obtained heater element has such a structure that the $Si_3N_4$ particles intervene among the $MoSi_2$ particles so that the resistance of the heater element becomes larger than that of $MoSi_2$.

$MoSi_2$ has a large positive temperature coefficient of resistance of $6.4 \times 10^{-3}$/deg. while $Si_3N_4$ has a negative temperature coefficient of resistance.

According to the present invention, since the ceramic heater has such a structure that the interconnecting $MoSi_2$ particles surround the scattered $Si_3N_4$ particles, electric paths are formed in the interconnecting $MoSi_2$ particles so that the temperature coefficient of resistance of the obtained ceramic heater can be increased.

BRIEF DESCRIPTION OF THE DRAWINGS

FIG. 8 shows the experimental result on the relation between the particle diameter of $MoSi_2$ powder and the durability of the heater element.

DETAILED DESCRIPTION OF THE EMBODIMENT

Hereinafter, the ceramic heater according to the present invention will be explained with reference to the embodiment wherein the heater is applied to a glow plug.

Figure 1:
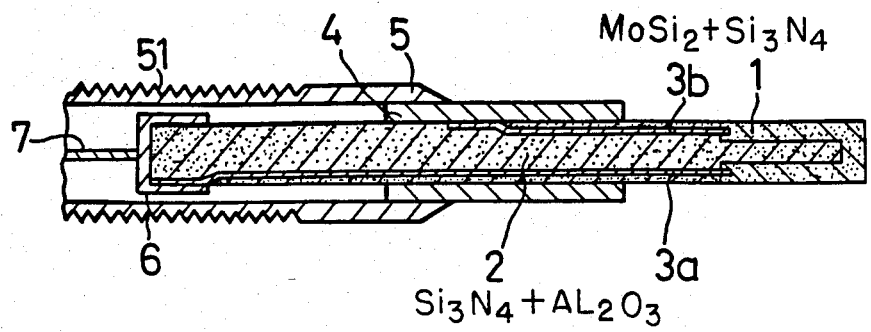
FIG. 1 is a sectional view of one embodiment of a glow plug according to the present invention.

As shown in FIG. 1, a ceramic heater comprises a heater element 1, a heater support member 2 for supporting the heater element 1 on the tip end thereof, and a pair of lead wires 3a, 3b embedded within the heater support member 2 and connected to the heater element 1, respectively.

The heater element 1 is formed of a sintered body of a mixture composed of $MoSi_2$ powder and $Si_3N_4$ powder having a particle diameter larger than that of $MoSi_2$ powder. The heater support member 2 is formed of a sintered body of a mixture composed of $Si_3N_4$ powder and $Al_2O_3$ powder. The heater element 1 is integrally sintered with the heater support member 2.

A metallic sleeve 4 is provided around the heater support member 2 and a metallic body 5 is provided around the metallic sleeve 4.

One end of the lead wire 3a is connected to one end of the heater element 1. The other end of the lead wire 3a extends to the base end of the heater support member 2 and is connected to a metallic cap 6 fit in the base end of the heater support member 2. The cap 6 is connected to an electric power source (not shown) by way of a nickel wire 7.

One end of the lead wire 3b is connected to the other end of the heater element 1. The other end of the lead wire 3b is connected to the metallic sleeve 4. The glow plug having the above described structure is secured to the wall (not shown) defining the combustion chamber (not shown) in the screw portion 51 formed on the outer surface of the metallic body 5.

Electric current flows into the heater element 1 after passing the nickel wire 7, the metallic cap 6 and the lead wire 3a, and is grounded after passing the lead wire 3b, the metallic sleeve 4 and the metallic body 5.

Figure 2:
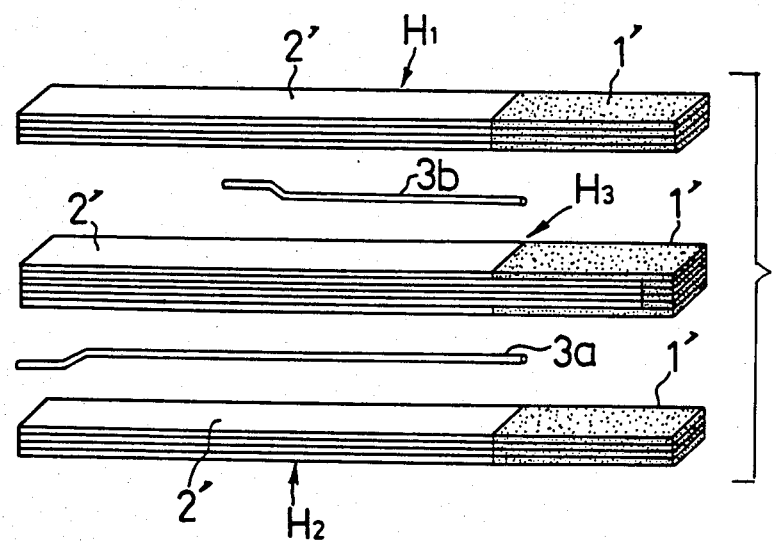
FIG. 2 is a view illustrating the producing steps of the glow plug of FIG. 1.

FIG. 2 is a view explaining the producing method of the heater element 1.

$MoSi_2$ powder, $Si_3N_4$ powder and an organic solvent are mixed and formed by the doctor blade method to obtain a plurality of ceramic sheets 1'.

$Si_3N_4$ powder, $Al_2O_3$ powder and an organic solvent are mixed and formed by the doctor blade method to obtain a plurality of ceramic sheets 2'.

The obtained ceramic sheets 1' and 2' are layered, respectively and assembled with each other as shown in FIG. 2 to obtain layered bodies H, $H_2$ and $H_3$.

Next, the layered bodies $H_1$, $H_2$ and $H_3$ are put on one another while sandwiching the lead wires 3a and 3b between two adjacent layered bodies. Then, the layered bodies $H_1$, $H_2$ and $H_3$ are laminated and hot-pressed at 1600° C. under a pressure of about 500 kg/cm². As a result, the heater element is obtained.

Hereinafter, the composition of the heater element 1 of the glow plug will be explained with reference to the experimental result thereon.

The following table shows the temperature coefficient of resistance and the resistance value at 20° C. of three kinds of heater elements having different combinations of average particle diameter of $MoSi_2$ powder and that of $Si_3N_4$ powder.

The temperature coefficient of resistance is shown as the ratio of the resistance of the heater element of which the temperature is raised to 900° C. by supplying electric current to the glow plug to the resistance of the heater element at a normal temperature (R 900° C./R 20° C.).

|  | particle diameter | | |
| --- | --- | --- | --- |
|  | $MoSi_2$ 0.9 μm $Si_3N_4$ 35 μm | $MoSi_2$ 0.9 μm $Si_3N_4$ 0.9 μm | $MoSi_2$ 5 μm $Si_3N_4$ 0.9 μm |
| R 900° C./R 20° C. | 3.6 | 1.6 | 1.2 |
| Resistance at a normal temp. (Ω) | 0.18 | 80 | 500 |

As is apparent from the above table, when the particle diameter of $Si_3N_4$ powder is larger than that of $MoSi_2$ powder, R 900° C./R 20° C. remarkably increases and the resistance at a normal temperature decreases as compared with the case where the particle diameter of $Si_3N_4$ powder is not more than that of $MoSi_2$ powder.

Figure 3:
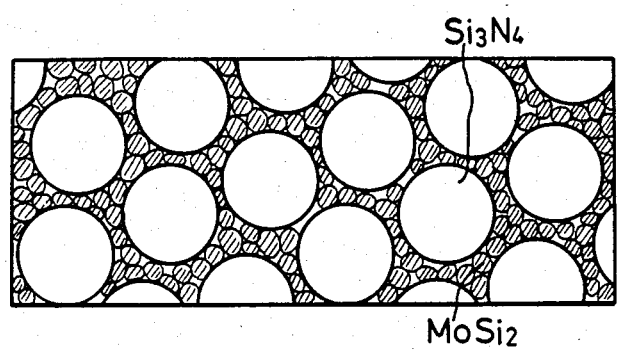
FIG. 3 is a view illustrating the structure of the heater element used in the ceramic heater of the present invention as a model.

FIG. 3 illustrates the structure of the heater element wherein the particle diameter of $Si_3N_4$ powder is larger than that of $MoSi_2$ powder as a model.

Figure 4:
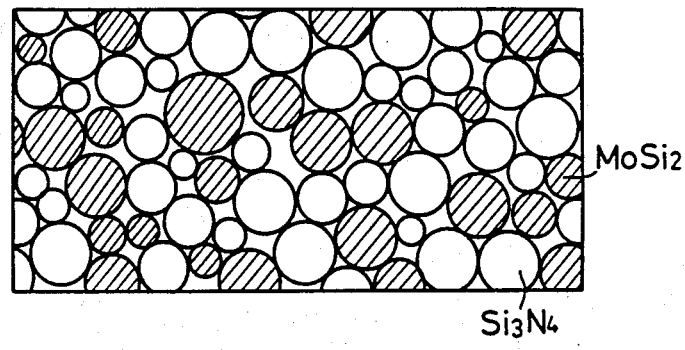
FIG. 4 is a view illustrating the structure of the heater element used in the conventional ceramic heater

FIG. 4 illustrates the structure of the heater element wherein the particle diameter of $Si_3N_4$ powder is substantially equal to that of $MoSi_2$ powder as a model.

In the heater element wherein the particle diameter of $Si_3N_4$ powder is larger than that of $MoSi_2$ powder, $MoSi_2$ particles having a large temperature coefficient of resistance and a small specific resistance come in contact with one another to form continuous electric paths. As a result, R 900° C./R 20° C. of the heater element is increased.

Figure 5:
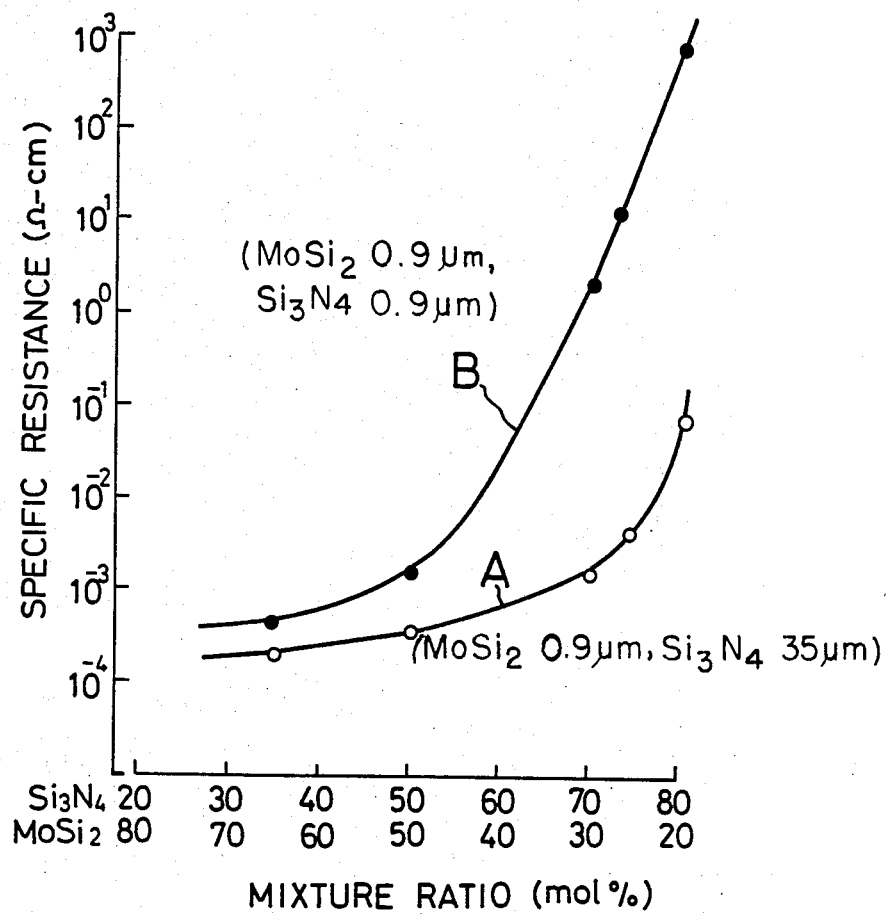
FIG. 5 shows variation in specific resistance for two heater elements A and B for various mixture ratios of $Si_3N_4$ powder and $MoSi_2$ powder.
Figure 6:
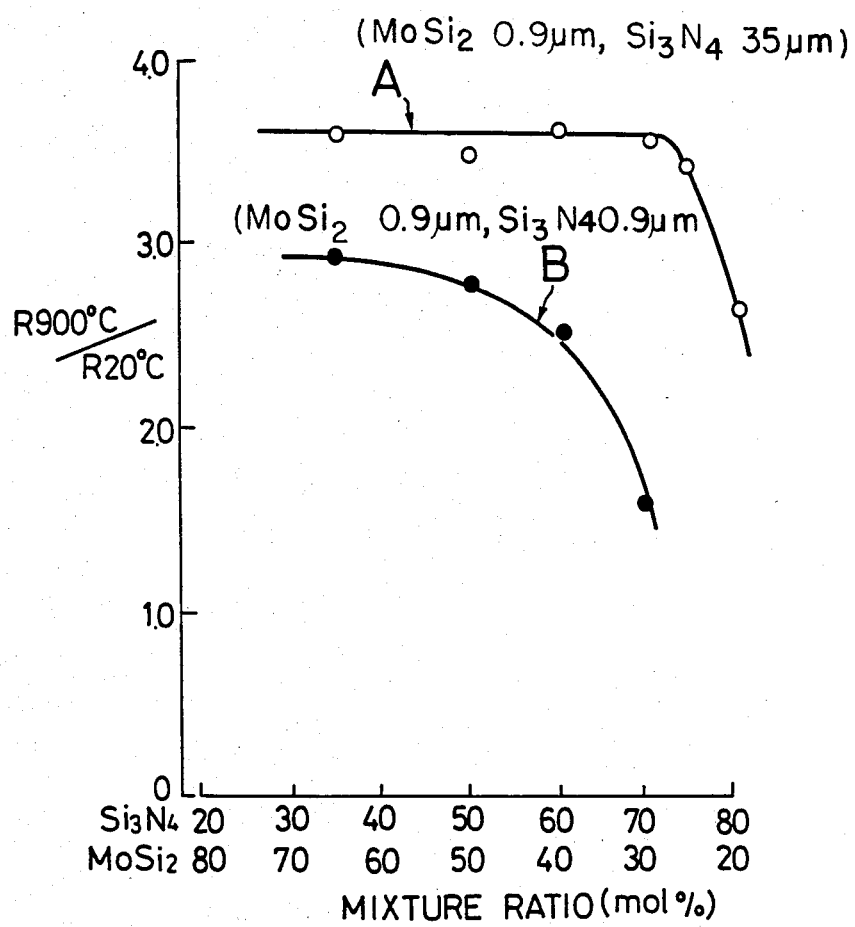
FIG. 6 shows variations for those heaters in the temperature coefficient of resistance for the same mixture ratios as in FIG. 5.

FIGS. 5 and 6 show the variations of the specific resistance at a normal temperature, and the temperature coefficient of resistance with the mixture ratio of $Si_3N_4$ powder and $MoSi_2$ powder, respectively. The line A shows the variation of the heater element composed of $MoSi_2$ powder having a particle diameter of 0.9 μm and $Si_3N_4$ powder having a particle diameter of 35 μm. The line B shows the variation of the heater element composed of $MoSi_2$ powder and $Si_3N_4$ powder, each having a particle diameter of 0.9 μm.

As shown in FIG. 5, the specific resistance of the element A (particle diameter of $MoSi_2$ powder < particle diameter of $Si_3N_4$ powder) is smaller than that of the element B (particle diameter of $MoSi_2$ powder = particle diameter of $Si_3N_4$ powder) in any mixture ratio. The difference in the specific resistance between the heater elements A and B increases with the increase of mixture ratio of $Si_3N_4$ powder.

In order to improve the rapidly heating property of the heater element, it is preferable to reduce the specific resistance thereof.

In the case of the element B, the mixture ratio of $Si_3N_4$ powder must be decreased to reduce the specific resistance thereof. However, when the mixture ratio of $Si_3N_4$ powder is decreased, the coefficient of thermal expansion is increased and the thermal shock resistance is lowered.

In the case of the element A, even when the mixture ratio of $Si_3N_4$ powder is increased to decrease the coefficient of thermal expansion of the heater element, the specific resistance thereof can be kept small.

As shown in FIG. 6, R 900° C./R 20° C. of the heater element A (particle diameter of $MoSi_2$ powder < particle diameter of $Si_3N_4$ powder) is larger than that of the heater element B (particle diameter of $MoSi_2$ powder = particle diameter of $Si_3N_4$ powder) in any mixture ratio. Furthermore, R 900° C./R 20° C. of the heater element A changes little in the range from 35 to 75 mol % of $Si_3N_4$ powder. This experimental result shows that the thermal shock resistance of the heater element A can be improved by increasing the mixture ratio of $Si_3N_4$ powder, maintaining high temperature coefficient of resistance.

As is apparent from FIGS. 5 and 6, the proper mixture ratio of $Si_3N_4$ powder is not more than 75 mol %. Over 75 mol %, the specific resistance at a normal temperature of the heater element increases so that the rapidly heating property thereof is lowered. In this case, R 900° C./R 20° C. also decreases. As a result, the adequate temperature control of the heater element becomes impossible.

When the mixture ratio of $Si_3N_4$ powder is decreased under 35 mol %, the thermal shock resistance of the heater element is lowered so that the durability required for the glow plug cannot be obtained.

Figure 7:
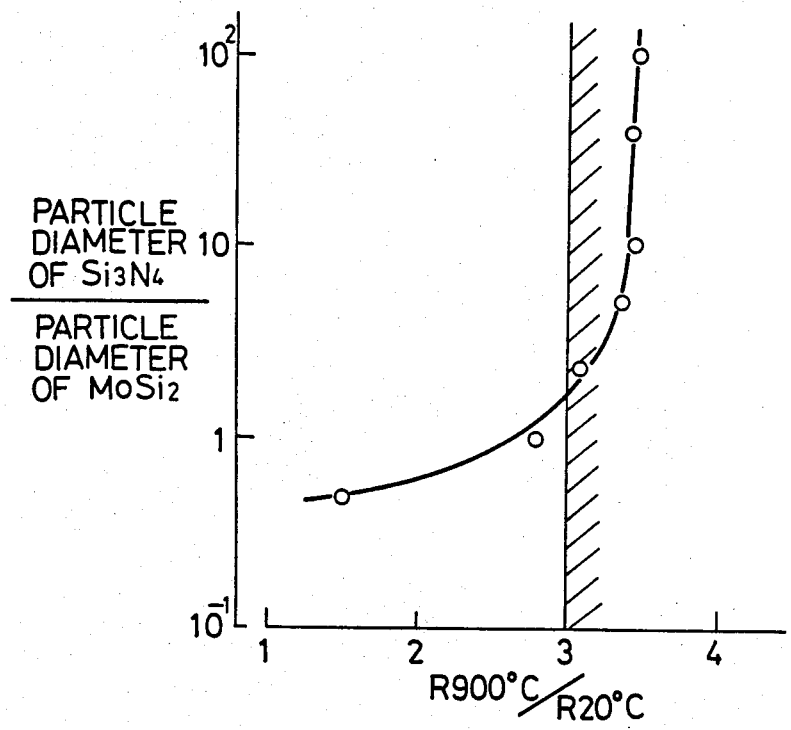
FIG. 7 shows the preferable range of the ratio of the particle diameter of $Si_3N_4$ powder to that of $MoSi_2$ powder in the case that the particle diameter of $MoSi_2$ powder is smaller than that of $Si_3N_4$ powder.

FIG. 7 shows the preferable range of the ratio of the particle diameter of $Si_3N_4$ powder to that of $MoSi_2$ powder in the case that the particle diameter of $MoSi_2$ powder is smaller than that of $Si_3N_4$ powder.

The variation of R 900° C./R 20° C. was examined by changing the average particle diameter of $Si_3N_4$ powder while maintaining that of $MoSi_2$ powder to 0.9 μm. In this case, the mixture ratio of $Si_3N_4$ powder and $MoSi_2$ powder was selected so that the resistance of the glow plug was about 0.2Ω, and R 900° C./R 20° C. in the selected mixture ratio was measured.

In the glow plug of such a type as to control the temperature of the heater element by detecting the resistance change thereof, a value not less than 3.0 of R 900° C./R 20° C. is required to reduce the dispersion of the controlled temperature. In order to satisfy the above requirement, the average particle diameter of $Si_3N_4$ powder must be made two times or more as large as that of $MoSi_2$ powder as shown in FIG. 7.

FIG. 8 shows the experimental result on the relation between the particle diameter of $MoSi_2$ powder and the durability of the heater element.

Such a voltage as to give the glow plug the equilibrium temperature of 1300° C., was applied to the glow plug for 1 minute. Then, the glow plug to which no voltage was applied, was cooled for 1 minute. This intermittent voltage applying operation was repeated and the variation of the resistance with the increase of number of the cycles of the voltage-applying operation was examined. Resistance increasing rate in FIG. 8 means the rate of increase in resistance to the initial resisctance. The $Si_3N_4$ powder used in this experiment has a constant average diameter of 30 μm and the $MoSi_2$ powder has different average diameters of 0.9 μm (line C), 2 μm (line D), 5 μm (line E) and 13 μm (line F).

As is apparent from FIG. 8, when the particle diameter of $MoSi_2$ powder is too large, the durability at a high temperature is worsened. The preferable average particle diameter of $MoSi_2$ powder is 2 μm or less.

In the above embodiment, the heater element is applied to the glow plug. In addition, the heater element of the present invention can be also used for other purposes.

As described above, the present invention provides a ceramic heater having an excellent rapidly heating property wherein a ceramic heater element is formed on one end of a heater support member made of electrically insulating ceramic.

According to the present invention, the heater element is formed of a sintered ceramic of a mixture of $MoSi_2$ powder and $Si_3N_4$ powder having an average particle diameter larger than that of $MoSi_2$ powder. The obtained heater element exhibits a temperature coefficient of resistance substantially equal to or near that of $MoSi_2$ itself and much larger than that of $Si_3N_4$. Therefore, the obtained heater element can accurately control the temperature in accordance with the resistance change thereof without any dispersion in controlled temperature.

Especially, when the average particle diameter of $Si_3N_4$ powder is two times or more as large as that of $MoSi_2$ powder, R 900° C./R 20° C. of the heater element can be increased to 3 or more.

Furthermore, despite of increasing mixture ratio of $Si_3N_4$ powder, the obtained heater element exhibits a high temperature coefficient of resistance. The thermal shock resistance of the heater element can be improved due to high mixture ratio of $Si_3N_4$ powder.

In addition, by using $MoSi_2$ powder having a small average particle diameter, preferably 2 μm or less, the durability at a high temperature of the obtained heater element can be largely improved.

What is claimed is:

1. A ceramic heater comprising:
   (1) a heater element formed of an electrically conductive ceramic sintered body;
   (2) a heater support member formed of an electrically insulating ceramic sintered body, said heater element being affixed to one end of said heater support member; and
   (3) an electric current supply means for supplying an electric current to said heater element;
   said heater element being formed of a sintered body of a mixture consisting essentially of $MoSi_2$ powder and 35 to 75 mol% of $Si_3N_4$ powder, the average particle diameter of $MoSi_2$ powder being not greater than 2 μm and the average particle diameter of said $Si_3N_4$ powder being at least twice as large as that of said $MoSi_2$ powder.

2. A ceramic heater according to claim 1, wherein said heater element has such a structure that interconnecting $MoSi_2$ particles surround scattered $Si_3N_4$ particles.

3. A ceramic heater according to claim 1, wherein said electric current supply means comprises a pair of lead wires for connecting said heater element to an electric power source, and said lead wires are embedded within said heater support member.

4. A ceramic heater according to claim 3, wherein said heater element is integrally sintered with said heater support member.

* * * * *